United States Patent
Tsuda et al.

(10) Patent No.: US 10,093,775 B2
(45) Date of Patent: Oct. 9, 2018

(54) AQUEOUS FLUOROPOLYMER DISPERSION

(71) Applicant: DAIKIN INDUSTRIES, LTD., Osaka-shi, Osaka (JP)

(72) Inventors: Nobuhiko Tsuda, Settsu (JP); Hiromichi Momose, Settsu (JP); Toshirou Miura, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/331,639

(22) Filed: Oct. 21, 2016

(65) Prior Publication Data
US 2017/0037195 A1 Feb. 9, 2017

Related U.S. Application Data

(63) Continuation of application No. 14/387,764, filed as application No. PCT/JP2013/059137 on Mar. 27, 2013, now abandoned.

(30) Foreign Application Priority Data

Mar. 27, 2012 (JP) ................. 2012-072241

(51) Int. Cl.
C08J 3/07 (2006.01)
C08L 27/18 (2006.01)
C08K 5/41 (2006.01)
C08K 5/06 (2006.01)
C08L 71/02 (2006.01)

(52) U.S. Cl.
CPC .............. C08J 3/07 (2013.01); C08K 5/06 (2013.01); C08K 5/41 (2013.01); C08L 27/18 (2013.01); C08L 71/02 (2013.01); C08J 2327/18 (2013.01); C08K 2201/019 (2013.01); C08L 2201/54 (2013.01)

(58) Field of Classification Search
CPC ...... C08F 114/26; C08K 5/42; C08J 2327/18; C08L 27/18
See application file for complete search history.

(56) References Cited

U.S. PATENT DOCUMENTS

| 3,009,892 | A | * | 11/1961 | Duddington | C08F 14/26 524/723 |
| 7,666,928 | B2 | * | 2/2010 | Johnson | C08J 3/07 210/662 |
| 7,709,566 | B2 | * | 5/2010 | Hoshikawa | B01F 17/0035 524/319 |
| 2006/0074178 | A1 | * | 4/2006 | Auyeung | C08J 3/05 524/544 |
| 2007/0282054 | A1 | | 12/2007 | Johnson et al. | |
| 2008/0033063 | A1 | | 2/2008 | Hoshikawa et al. | |
| 2008/0214714 | A1 | | 9/2008 | Hoshikawa et al. | |

FOREIGN PATENT DOCUMENTS

| JP | 2008-37914 A | 2/2008 |
| JP | 2009-538964 A | 11/2009 |
| JP | 2011-252054 A | 12/2011 |
| WO | 2007/046482 A1 | 4/2007 |

OTHER PUBLICATIONS

Communication dated Sep. 28, 2015 from the European Patent Office issued in corresponding application No. 13770150.4.
International Preliminary Report on Patentability issued by the International Bureau of WIPO dated Oct. 1, 2014 in International Patent Application PCT/JP2013/059137.
International Search Report for PCT/JP2013/059137 dated Jun. 25, 2013 [PCT/ISA/210].

* cited by examiner

Primary Examiner — Rip A Lee
(74) Attorney, Agent, or Firm — Sughrue Mion, PLLC

(57) ABSTRACT

The present invention aims to provide an aqueous dispersion that contains particles of a fluoropolymer at high concentrations and has a less variable pH, and in which aggregates are less likely to be generated even after the aqueous dispersion has been stored for a long time. The present invention relates to an aqueous dispersion, including: particles of a fluoropolymer having an average primary particle size of 0.1 to 0.5 μm in an amount of 50 to 70% by mass; a nonionic surfactant in an amount of 2 to 10% by mass based on the amount of the fluoropolymer; and ammonium lauryl sulfate in an amount of 0.0001 to 1% by mass based on the amount of the fluoropolymer, wherein an amount of a fluorine-containing anionic surfactant is less than 10 ppm.

6 Claims, No Drawings

AQUEOUS FLUOROPOLYMER DISPERSION

CROSS-REFERENCE TO RELATED APPLICATIONS

This application is a Continuation of U.S. application Ser. No. 14/387,764 filed Sep. 24, 2014, now abandoned, which is a National Stage of International Application No. PCT/JP2013/059137, filed on Mar. 27, 2013, which claims priority from Japanese Patent Application No. 2012-072241, filed on Mar. 27, 2012, the contents of all of which are incorporated herein by reference in their entirety.

TECHNICAL FIELD

The present invention relates to an aqueous dispersion of a fluoropolymer.

BACKGROUND ART

An aqueous dispersion containing fluoropolymer particles can be formed into a film with excellent characteristics such as chemical stability, non-adhesion, and weather resistance, by coating, impregnation, or other methods, and is therefore widely used, for example, for cooking equipment, lining of pipes, and glass fiber cloth impregnation film.

Patent Literature 1 discloses an aqueous fluororesin dispersion containing fluororesin particles and a nonionic surfactant, and further discloses that condensation is accelerated by adding ammonium laurate, triethanolamine laurate, sodium lauryl sulfate, ammonium lauryl sulfate, triethanolamine lauryl sulfate, or the like in an amount of not more than 0.2% by mass based on the amount of the fluororesin.

Patent Literature 2 discloses a method for reducing a fluorosurfactant content of an aqueous fluoropolymer dispersion containing a fluorosurfactant, which is stabilized with a nonionic surfactant, and further discloses that any of various non-fluorinated anionic surfactants may be used. Examples of the non-fluorinated anionic surfactants include, but are not limited to, sodium lauryl sulfate, sodium dodecylbenzylsulfonate, and secondary sodium alkyl sulfonate. The non-fluorinated anionic surfactants are particularly preferably ammonium lauryl sulfate or alkali metals, and most preferably sodium lauryl sulfate.

Patent Literature 3 discloses a production method of an aqueous fluoropolymer dispersion, which involves bringing an aqueous fluoropolymer dispersion containing a fluoropolymer, a fluorine-containing emulsifier, and a specific organic carboxylic acid into contact with a weakly basic anion-exchange resin, thereby adsorbing and removing the fluorine-containing emulsifier; and bringing the resulting aqueous fluoropolymer dispersion into contact with a strongly basic anion-exchange resin, thereby adsorbing and removing the organic carboxylic acid. Patent Literature 3 further discloses that an anionic surfactant other than the fluorine-containing emulsifier may be added before or after condensation in order to improve the stability and condensation rate. Examples of the anionic surfactant include ammonium laurate, ethanolamine laurate, ammonium cinnamate, ammonium lauryl sulfate, sodium lauryl sulfate, triethanolamine lauryl sulfate, and p-t-butyl ammonium benzoate.

CITATION LIST

Patent Literature

Patent Literature 1: JP 2008-37914 A
Patent Literature 2: JP 2009-538964 T
Patent Literature 3: JP 2011-252054 A

SUMMARY OF INVENTION

Technical Problem

An aqueous dispersion of a fluoropolymer with insufficient storage stability has a problem in that sludge is generated in the dispersion at the bottom of a container with time during storage and still standing. One of the reasons for generation of sludge is decrease in pH with time. Further, decrease in pH of the aqueous dispersion may cause mold growing or corrosion of a substrate to which the aqueous dispersion has been applied.

Further, a fluorine-containing anionic surfactant used in the production of the aqueous dispersion is usually removed and recovered for reducing environmental impact and recycling the expensive fluorine-containing anionic surfactant. Polymer aggregates are likely to be generated in an aqueous dispersion from which the fluorine-containing anionic surfactant has been removed.

The present invention aims to provide an aqueous dispersion which contains particles of a fluoropolymer at high concentrations and has a less variable pH, and in which aggregates are less likely to be generated even after the aqueous dispersion has been stored for a long time.

Solution to Problem

The present inventors have made various studies, and have found a solution to the above problem. They found that addition of ammonium lauryl sulfate in an aqueous dispersion suppresses variation of pH of the aqueous dispersion and generation of aggregates. Thus, the present invention has been completed.

That is, the present invention relates to an aqueous dispersion, including:

particles of a fluoropolymer having an average primary particle size of 0.1 to 0.5 μm in an amount of 50 to 70% by mass;

a nonionic surfactant in an amount of 2 to 10% by mass based on the amount of the fluoropolymer; and ammonium lauryl sulfate in an amount of 0.0001 to 1% by mass based on the amount of the fluoropolymer, wherein an amount of a fluorine-containing anionic surfactant is less than 10 ppm.

In the aqueous dispersion of the present invention, the amount of the ammonium lauryl sulfate is preferably 0.01 to 0.1% by mass based on the amount of the fluoropolymer.

The fluoropolymer is preferably polytetrafluoroethylene.

The nonionic surfactant is preferably a polyoxyethylene alkyl ether.

Advantageous Effects of Invention

The aqueous dispersion of the present invention containing particles of a fluoropolymer at high concentrations has a less variable pH, and aggregates are less likely to be generated in the aqueous dispersion, even after the aqueous dispersion has been stored for a long time.

DESCRIPTION OF EMBODIMENTS

The present invention will be explained in more detail below.

The aqueous dispersion of the present invention contains particles of a fluoropolymer, a nonionic surfactant, and ammonium lauryl sulfate.

The aqueous dispersion of the present invention contains ammonium lauryl sulfate. Therefore, pH of the dispersion is less variable and aggregates are less likely to be generated in the aqueous dispersion even after the aqueous dispersion has been stored for a long time. These effects are specific to ammonium lauryl sulfate, and surprisingly, sodium lauryl sulfate or other lauryl sulfates other than ammonium lauryl sulfate is totally ineffective in suppressing pH variation. Further, addition of sodium lauryl sulfate or other lauryl sulfates other than ammonium lauryl sulfate only slightly improves storage stability as compared to addition of ammonium lauryl sulfate.

The aqueous dispersion of the present invention contains ammonium lauryl sulfate in an amount of 0.0001 to 1% by mass based on the amount of the fluoropolymer. The amount of the ammonium lauryl sulfate is preferably 0.01 to 0.1% by mass, more preferably 0.02 to 0.1% by mass, and still more preferably 0.025 to 0.1% by mass, based on the amount of the fluoropolymer. Too small an amount of the ammonium lauryl sulfate leads to poor storage stability of the aqueous dispersion. Further, too large an amount of the ammonium lauryl sulfate surprisingly leads to poor storage stability of the aqueous dispersion.

The particles of the fluoropolymer contain fluorine atoms bonded to carbon atoms.

The melting point of the fluoropolymer is preferably 130° C. to 370° C. and more preferably 324° C. to 347° C. The melting point is determined by differential scanning calorimetry (DSC) at a temperature rise rate of 10° C./min.

Examples of the fluoropolymer include, but are not particularly limited to, polytetrafluoroethylene [PTFE], tetrafluoroethylene [TFE]/hexafluoropropylene [HFP] copolymers [FEP], TFE/perfluoro (alkyl vinyl ether) [PAVE] copolymers [PFA], ethylene/TFE copolymers [ETFE], polyvinylidene fluoride [PVDF], and polychlorotrifluoroethylene [PCTFE].

The PTFE fibrillates, and is not limited as long as it has non-melt processability, and may be a tetrafluoroethylene [TFE] homopolymer or modified PTFE.

The "modified PTFE" means one obtained by copolymerising TFE with a comonomer in such a small amount as not to provide melt processability to the resulting copolymer. Examples of the monomer in a small amount include fluoroolefins such as HFP and chlorotrifluoroethylene [CTFE], fluoro(alkylvinyl ether) having a C1-C5 alkyl group, particularly a C1-C3 alkyl group; fluorodioxole; perfluoroalkylethylene; and ω-hydroperfluoroolefin. The amount of the monomer is preferably not more than 2 mol %, more preferably not more than 1 mol %, and still more preferably less than 1 mol %, based on the amount of all monomer units composing the fluoropolymer. The lower limit is not particularly restricted, and may be 0.0001 mol %.

The number average molecular weight of the PTFE is preferably 100,000 to 30,000,000, and more preferably not less than 3,500,000 and not more than 8,000,000. The number average molecular weight is calculated from a standard specific gravity determined by a water displacement method in accordance with ASTM D-792 using a sample formed in accordance with ASTM D-4895 98.

The fluoropolymer is preferably a perfluoropolymer. In particular, PTFE is preferred. PTFE fibrillates, and is therefore more likely to aggregate than other fluoropolymers. Accordingly, storage stability is largely improved by the presence of ammonium lauryl sulfate.

The average primary particle size of the particles of the fluoropolymer is 0.1 to 0.5 μm. The average primary particle size is preferably 0.1 to 0.4 μm.

The average primary particle size is determined as follows. A standard curve of the transmittance of 550 nm incident light through a unit length of an aqueous dispersion adjusted to a fluoropolymer concentration of 0.22% by mass versus an average primary particle size determined by measuring the particle diameter in a certain specific direction on a transmission electron micrograph is constructed, and the average primary particle size is determined from the transmittance based on the standard curve.

The aqueous dispersion of the present invention contains 50 to 70% by mass of the particles of the fluoropolymer based on the amount of the aqueous dispersion. The lower limit of the amount of the particles of the fluoropolymer is more preferably 55% by mass, and the upper limit thereof is more preferably 65% by mass. The aqueous dispersion of the present invention thus containing particles of the fluoropolymer at high concentrations has a less variable pH, and aggregates are less likely to be generated in the aqueous dispersion, even after the aqueous dispersion has been stored for a long time.

The amount (P) of the particles of the fluoropolymer herein is determined from the formula: $P = Z/X \times 100 (\%)$, wherein an ignition residue (Z g) is obtained by drying about 1 g (X g) of a sample in an aluminum cup (diameter: 5 cm) at 100° C. for 1 hour and further drying at 300° C. for 1 hour.

The aqueous dispersion of the present invention contains a nonionic surfactant. The nonionic surfactant may be any publicly known one as long as it is formed of a fluorine-free non-ionic compound. Examples of the nonionic surfactant include ether type nonionic surfactants such as polyoxyethylene alkyl phenyl ethers, polyoxyethylene alkyl ethers, and polyoxyethylene alkylene alkyl ethers; polyoxyethylene derivertives such as an ethylene oxide/propylene oxide block copolymer; ester type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine type nonionic surfactants such as polyoxyethylene alkylamine and alkyl alkanolamide. These are all non-fluorinated nonionic surfactants.

A hydrophobic group in a compound composing the nonionic surfactant may be any of alkyl phenol groups, linear alkyl groups, and branched alkyl groups, and is preferably a compound free of a benzene ring, such as a compound free of an alkyl phenol group.

In particular, the nonionic surfactant is preferably polyoxyethylene alkyl ethers. The polyoxyethylene alkyl ethers preferably include a polyoxyethylene alkyl ether structure having a C10-C20 alkyl group, and more preferably include a polyoxyethylene alkyl ether structure having a C10-C15 alkyl group. The alkyl group in the polyoxyethylene alkyl ether structure preferably has a branched structure.

Examples of commercially available polyoxyethylene alkyl ethers include Genapol X080 (product name, produced by Clariant), TERGITOL 9-S-15 (product name, produced by Clariant), NOIGEN TDS-80 (product name, produced by DAI-ICHI KOGYO SEIYAKU CO., LTD.), and LEOCOL TD-90 (product name, produced by Lion Corporation).

The cloud point of the nonionic surfactant is preferably 40° C. to 85° C. A cloud point is a temperature at which an aqueous solution containing a nonionic surfactant begins to become cloudy by increasing the temperature of the aqueous solution. A cloud point can be determined in the usual way as follows: a nonionic surfactant is dissolved in water so that the concentration of the nonionic surfactant is 1%; a nonionic surfactant is dissolved in a 25% aqueous solution of butyl carbitol so that the concentration of the nonionic surfactant is 10%; or a nonionic surfactant is dissolved in a 5% aqueous solution of potassium sulfate so that the concentration of the nonionic surfactant is 1%.

The HLB of the nonionic surfactant is preferably 10 to 15. If the HLB is smaller than 10, improvement in storage stability which is an object of the present invention is insufficient. If the HLB is more than 15, the storage stability tends to be poor. The HLB is still more preferably in the range of 12 to 14. In this range, an aqueous dispersion with excellent storage stability can be obtained.

The aqueous dispersion of the present invention contains the nonionic surfactant in an amount of 2 to 10% by mass based on the amount of the fluoropolymer. The amount of the nonionic surfactant is preferably 2 to 6% by mass, and more preferably 4 to 6% by mass. Too much a nonionic surfactant increases the viscosity, resulting in poor handleability, or deterioration of the storage stability. Too little a nonionic surfactant deteriorates the storage stability of the aqueous dispersion.

The amount of the nonionic surfactant (N) herein is calculated from the formula: $N=[(Y-Z)/X]\times100(\%)$, wherein an ignition residue (Y g) is obtained by heating about 1 g (X g) of a sample in an aluminum cup (diameter: 5 cm) at 100° C. for 1 hour, and an ignition residue (Z g) is obtained by further heating the resulting ignition residue (Y g) at 300° C. for 1 hour.

The aqueous dispersion of the present invention preferably contains an aqueous medium. The aqueous medium may be water, or may contain non-fluorine-containing organic solvents and/or fluorine-containing organic solvents such as alcohols, ethers, ketones, and paraffin wax, in addition to water.

The aqueous dispersion of the present invention contains a fluorine-containing anionic surfactant in an amount of less than 10 ppm. Due to the above reason, the smaller the amount of the fluorine-containing anionic surfactant is, the better. The fluorine-containing anionic surfactant is a compound having a fluorine atom and showing interface activity. The aqueous dispersion of the present invention thus containing little of or no fluorine-containing anionic surfactant has a less variable pH, and aggregates are less likely to be generated in the aqueous dispersion, even after the aqueous dispersion is stored for a long time.

The amount of the fluorine-containing anionic surfactant may be determined in such a way that methanol in an amount equal to the amount of a measuring aqueous dispersion is added to the aqueous dispersion, soxhlet extraction is performed, and high-performance liquid chromatography [HPLC] is then performed.

Examples of the fluorine-containing anionic surfactant include perfluorocarboxylic acids and the salts thereof, perfluorosulfonic acids and the salts thereof, and fluoroether compounds. Examples of the fluorocarboxylic acids include perfluoroalkyl carboxylic acids such as perfluorooctanoic acid.

The fluorine-containing anionic surfactant is preferably a fluorine-containing anionic surfactant represented by the formula (5):

$$Rf^1—Y^1 \qquad (5)$$

(in the formula, $Rf^1$ represents a linear or branched C2-C12 fluoroalkyl group to which a divalent oxygen atom may be inserted, $Y^1$ represents $—COOM^1$, $—SO_3M^2$, $—SO_2NM^3M^4$, or $—PO_3M^5M^6$, and the above $M^1$, $M^2$, $M^3$, $M^4$, $M^5$, and $M^6$ are the same or different from one another, and each represent H or a univalent cation). Examples of the univalent cation include $—Na$, $—K$, and $—NH_4$. The $Rf^1$ is more preferably a linear or branched C2-C6 fluoroalkyl group to which a divalent oxygen atom may be inserted.

$Y^1$ is preferably $—COOH$, $—COONa$, $—COOK$, or $—COONH_4$, and more preferably $—COONH_4$.

The fluorine-containing anionic surfactant is more preferably a fluorine-containing anionic surfactant represented by the formula (6):

$$CF_3—(CF_2)_{n1}—Y^1 \qquad (6)$$

(in the formula, n1 represents an integer of 1 to 5, and $Y^1$ is as defined above) or a fluorine-containing anionic surfactant represented by the formula (7):

$$Rf^2O—Rf^3O—Rf^4—Y^1 \qquad (7)$$

(in the formula, $Rf^2$ represents a C1-C3 fluoroalkyl group, and $Rf^3$ and $Rf^4$ are each independently a linear or branched C1-C3 fluoroalkylene group, the total number of carbons of $Rf^2$, $Rf^3$, and $Rf^4$ being not more than 6; and $Y^1$ is as defined above).

Examples of the fluorine-containing anionic surfactant represented by the formula (6) include $CF_3(CF_2)_4COONH_4$, $CF_3(CF_2)_3COONH_4$, $CF_3(CF_2)_2COONH_4$, $CF_3(CF_2)_3SO_3Na$, and $CF_3(CF_2)_3SO_2NH_2$.

Examples of the fluorine-containing anionic surfactant represented by the formula (7) include a fluorine-containing anionic surfactant represented by the formula:

$$CF_3O—CF(CF_3)CF_2O—CX^1(CF_3)—Y^1$$

(in the formula, $X^1$ represents H or F, and $Y^1$ is as defined above), a fluorine-containing anionic surfactant represented by the formula:

$$CF_3O—CF_2CF_2CF_2O—CFX^1CF_2—Y^1$$

(in the formula, $X^1$ represents H or F, and $Y^1$ is as defined above), and a fluorine-containing anionic surfactant represented by the formula:

$$CF_3CF_2O—CF_2CF_2O—CFX^1—Y^1$$

(in the formula, $X^1$ represents H or F, and $Y^1$ is as defined above).

The number average molecular weight of the fluorine-containing anionic surfactant is preferably not more than 1000, and more preferably not more than 500 because such a surfactant is easily removed. In addition, the fluorine-containing anionic surfactant preferably has 5 to 12 carbons. The number average molecular weight herein is measured on the polystyrene equivalent basis by GPC (gel permeation chromatograph) measurement.

The aqueous dispersion of the present invention may contain, if necessary, other resins as long as the features of the present invention are not impaired.

Examples of the other resins include, but are not particularly limited to, polyethylene oxide (dispersion stabilizer), polyethyleneglycol (dispersionstabilizer), phenol resins, urea resins, epoxy resins, melamine resins, polyester resins, polyether resins, acrylic silicone resins, silicone resins, silicone polyester resins, and polyurethane resins.

The aqueous dispersion of the present invention preferably has a pH of 7 to 12, and more preferably has a pH of 8 to 11 for good storage stability. Since the aqueous dispersion of the present invention contains ammonium lauryl sulfate, the special effect of maintaining the pH for a long period of time is provided.

The aqueous dispersion of the present invention may contain an additive for enhancing the coating property and the property of a resulting coating film.

The additive may be selected depending on the intended use of a resulting coated article, and examples of the additive include, but are not particularly limited to, leveling agents, solid lubricants, wood flour, quartz sand, carbon black, diamond, tourmaline, germanium, alumina, silicone nitride, fluorite, clay, talc, extender pigments, various bulking agents, conductive fillers, bright materials, pigments, fillers, pigment dispersants, anti-settling agents, water absorbers, surface conditioners, thixotropy imparting agents, viscosity modifiers, anti-gelling agents, ultraviolet absorbers, light stabilizers, plasticizers, anti-flooding agents, anti-skinning agents, anti-scratch agents, mildew proofing agents, anti-microbial agents, antioxidants, antistatic agents, silane coupling agents, defoaming agents, drying agents, and cissing inhibitors.

Examples of the bright materials include mica, metal powder, glass beads, glass bubbles, glass flakes, and glass fibers. The aqueous dispersion of the present invention containing such a bright material may be formed into a coating film with excellent outward appearance. The amount of the bright material is preferably 0.1 to 10.0% by mass based on the solids content of the aqueous dispersion.

Examples of the metal powder include, but are not particularly limited to, powder of an elemental metal such as aluminum, iron, tin, zinc, gold, silver, and copper; and powder of an alloy such as aluminum alloy and stainless. The metal powder may be in any form, and may be in the form of particles, flakes, or the like. The aqueous dispersion of the present invention may be a clear coating material not containing such metal powder as coloring components.

Examples of the viscosity modifier include methylcellulose, alumina sol, polyvinyl alcohol, and a carboxylated vinyl polymer.

Examples of the defoaming agent include non-polar solvents such as toluene, xylene, C9-C11 hydrocarbons; and silicone oil.

Examples of the drying agent include cobalt oxide.

The aqueous dispersion of the present invention can be preferably produced by a production method including the steps of polymerizing fluoromonomers in the presence of the fluorine-containing anionic surfactant to obtain an aqueous dispersion containing particles of a fluoropolymer; adding the nonionic surfactant into the aqueous dispersion; removing the fluorine-containing anionic surfactant from the aqueous dispersion; and adding ammonium lauryl sulfate into the aqueous dispersion from which the fluorine-containing anionic surfactant has been removed.

The production method preferably includes the step of adding an alkali into the aqueous dispersion to adjust the pH to 7 to 12, and preferably to 8 to 11 before or after the step of adding ammonium lauryl sulfate for improving the storage stability of the resulting aqueous dispersion. Examples of the alkali include alkali-metal hydroxides and ammonia. Preferred among these is ammonia.

Examples of the fluorine-containing monomer contributing to the polymerization include, but are not particularly limited to, TFE, HFP, PAVE, vinylidene fluoride [VDF], and CTFE. These fluorine-containing monomers used for the polymerization may be used alone or two or more of these may be used in combination. If necessary, a non-fluorine-containing monomer such as ethylene may also be used in the polymerization.

The polymerization is so-called emulsion polymerization, and can be performed by a publicly known method. The temperature, pressure, and other conditions of the polymerization may be appropriately set depending on the kinds and amounts of the fluorine-containing monomer and the fluorine-containing anionic surfactant, and the kind of an intended fluoropolymer. Publicly known polymerization stabilizers and polymerization initiators may be used.

The fluorine-containing anionic surfactant may be removed by any method, and may be removed by performing, for example, conventionally known condensation and purification. Any one of the conventionally known operations may be performed only at once, or any one or combination of the operations may be performed twice or more.

Examples of the method for removing the fluorine-containing anionic surfactant include a cloud point concentration method according to WO 2004/050719, treatment with an anion exchanger according to JP 2002-532583 T, and ultrafiltration according to JP S55-120630 A. For example, the method for removing the fluorine-containing anionic surfactant may be a method including contacting an aqueous dispersion containing a nonionic surfactant with an anion-exchange resin including a strongly basic resin preliminarily converted into the OH form, under basic environment; and phase-separating and condensing the resulting aqueous dispersion.

The phase-separation condensing can be performed in such away that an aqueous dispersion containing a nonionic surfactant is heated and separated into a fluoropolymer-non-containing phase (supernatant phase) and a fluoropolymer-containing phase (condensed phase), and the fluoropolymer non-containing phase is removed and the fluoropolymer-containing phase is recovered.

The aqueous dispersion of the present invention may preferably be used as a coating material, and specifically used as a top coating material, an intermediate coating material, or a coating material for lining.

The coating may be performed by various methods similar to conventional coating methods, such as a dipping method, a spray method, a roll coating method, a doctor blade method, a spin flow coating method, and a curtain flow coating method.

The aqueous dispersion of the present invention may be applied directly to a substrate. In order to improve adhesion, it is desirable that a primer layer be formed and the aqueous dispersion be applied thereto. Examples of the substrate to be used include, but are not particularly limited to, substrates made of various metals, porcelain enamel, glass, or various ceramics. Further, in order to improve adhesion, a surface of a substrate is preferably made rough, for example, by sandblasting.

The aqueous dispersion applied to a substrate is then dried under usual conditions. Dry to touch is achieved by drying preferably at room temperature to 150° C., and more preferably at 80° C. to 150° C. for 5 to 20 minutes.

A dried coating film is sintered (processed). The sintering (processing) temperature and time may be changed depending on the kind or melting temperature of the fluororesin. For example, sintering is performed at the melting temperature or higher of the fluororesin, and is performed usually at 360° C. to 415° C. for 5 to 30 minutes.

A primer layer may be formed in such a way that a primer is applied, dried, and sintered, and the aqueous dispersion of the present invention is then applied thereto, and dried and sintered (2-coat 2-bake process); a primer is applied and dried, and the aqueous dispersion of the present invention is then applied thereto and dried, and both the primer and the aqueous fluoropolymer dispersion are simultaneously sintered (2-coat 1-bake process); or a primer is applied and dried, an intermediate coating material containing a bright material, which is the aqueous dispersion of the present invention, is applied thereto and dried, a top coating material, which is a clear coating material other than the aqueous dispersion of the present invention, is applied thereto and dried, and these are simultaneously sintered (3-coat 1-bake process). In addition, after application of a primer, an intermediate coating material containing a bright material, and a top coating material as a clear coating material, which are both the aqueous dispersion of the present invention, may subsequently be applied.

Coated articles listed below can be produced by application of the aqueous dispersion of the present invention. Examples of the coated articles include cooking equipment such as frying pans, grill pans, pressure cookers, other various pans, rice cookers, rice cake machines, ovens, hot plates, bread molds, knives, and gas cookers; food and beverage containers such as electric pots and ice cube trays; equipment for food industry such as mixing rolls, mill rolls, conveyors, and hoppers; industrial products such as rolls for office automation devices [OA], belts for OA devices, separation pawls for OA devices, paper making rolls, and calender rolls for film production; metal molds and molds for molding foamed polystyrene and the like, release plates for forming dies such as release plates for producing plyboards and decorative plates; kitchen equipment such as range hoods; frozen food processing equipment such as conveyor belts; tools such as saws, files, dies, and borers; household products such as irons, scissors, and knives; metal foils and electric wires; sliding bearings of food processing machines, packaging machines, and spinning machines; slide members of cameras and watches; auto parts such as pipes, valves, and bearings; and snow shovels, plows, parachutes, ship bottoms, boilers, and industrial containers (particularly for semiconductor industry).

The aqueous dispersion of the present invention may be used, for example, in impregnation involving impregnating a porous medium such as a nonwoven fabric and a resin molded product in the aqueous dispersion, drying the medium, and preferably sintering the medium; or in cast film formation involving applying the aqueous dispersion to a substrate such as glass, drying the applied dispersion, immersing the resulting product in water as needed, and removing the substrate to obtain a thin film. For example, the aqueous dispersion is used as aqueous dispersion coating materials, binders for electrodes, and water repellents for electrodes.

The aqueous dispersion of the present invention may preferably be used as a processing aid. Use of the aqueous fluoropolymer dispersion of the present invention as a processing aid in combination with a host polymer or the like improves the melt strength at melt processing of the host polymer, and the mechanical strength, electrical characteristics, flame retardancy, anti-dropping property, and sliding property of the resulting polymer.

The aqueous dispersion of the present invention containing PTFE as the fluoropolymer is preferably used as a processing aid after combining with a hot melt processable fluororesin. The aqueous dispersion of the present invention is preferred as a material of PTFE, which is described, for example, in JP H11-49912 A, JP 2003-24693 A, U.S. Pat. No. 5,804,654, JP H11-29679 A, and JP 2003-2980 A. The aqueous dispersion of the present invention is as good as the processing aids described in the publications.

The aqueous fluoropolymer dispersion of the present invention containing polytetrafluoroethylene as the fluoropolymer (B) is preferably formed into co-coagulation powder by mixing with an aqueous dispersion of a hot melt processable fluororesin and coagulating the mixture. The co-coagulation powder is preferred as a processing aid. Examples of the hot melt processable fluororesin include FEP, PFA, ETFE, and EFEP. Preferred among these is FEP.

The aqueous dispersion of the present invention containing PTFE as the fluoropolymer is preferably used as a dust-control treatment agent. The dust-control treatment agent may be used as follows: it is mixed with a dust-emitting substance, and the mixture is subjected to compression-shearing action at a temperature of 20° C. to 200° C. to fibrillate polytetrafluoroethylene, thereby emission of dust of dust-emitting substance is suppressed. For example, the dust-control treatment agent may be used in the methods disclosed, for example, in JP 2827152 B and JP 2538783 B. The dust-control treatment agent is used in the fields of building-products, soil stabilizers, solidifying materials, fertilizers, landfill of incineration ash and harmful substance, and explosion proof equipment, and cosmetics.

The aqueous dispersion of the present invention may preferably be used for the dust-control treatment agent composition according to WO 2007/004250, and may be used in the dust-control treatment according to WO 2007/000812.

The aqueous dispersion of the present invention containing PTFE as the fluoropolymer is preferably used as a material of PTFE fibers obtained by a dispersion spinning method. The dispersion spinning method is a method for providing PTFE fibers by mixing a PTFE aqueous dispersion with an aqueous dispersion of a matrix polymer, extruding the mixture to form an intermediate fiber structure, and sintering the intermediate fiber structure to decompose the matrix polymer and sinter the PTFE particles.

EXAMPLE

The present invention is described in more detail below with reference to examples, but is not limited only to these examples.

The values of examples were determined by the following methods.

(1) Average Primary Particle Size

A standard curve of the transmittance of 550 nm incident light through a unit length of an aqueous dispersion adjusted to a resin solids concentration of 0.22% by mass versus an average primary particle size determined by measuring the particle diameter in a certain direction on a transmission electron micrograph was constructed. The average primary particle size was determined from the transmittance based on the standard curve.

(2) Fluoropolymer Concentration (P)

The fluoropolymer concentration was determined from the formula: $P=Z/X\times100(\%)$, wherein an ignition residue (Z g) was obtained by drying about 1 g (X g) of a sample in an aluminum cup (diameter: 5 cm) at 100° C. for 1 hour and further drying at 300° C. for 1 hour.

(3) Fluorine-Containing Anionic Surfactant Concentration

The fluorine-containing anionic surfactant concentration was determined in such a way that methanol in an amount equal to the amount of the resulting aqueous dispersion was added to the aqueous dispersion, soxhlet extraction was performed, and high-performance liquid chromatography [HPLC] was performed under the following conditions. The fluorine-containing anionic surfactant concentration was calculated using a standard curve of a known fluorine-containing anionic surfactant concentration obtained from HPLC measurement using the above eluate and conditions.

(Measurement Condition)
Column: ODS-120T (4.6φ×250 mm, produced by TOSO CORPORATION)
Developer solution: Acetonitrile/0.6% by mass aqueous perchloric
acid solution=1/1 (vol/vol %)
Amount of sample: 20 μL
Flow rate: 1.0 ml/min
Detection wavelength: UV 210 nm
Column temperature: 40° C.

(4) Amount (N) of Nonionic Surfactant

The amount of the nonionic surfactant was determined as follows: the amount N is calculated from the formula: N=[(Y−Z)/X]100(%), wherein an ignition residue (Y g) was obtained by heating about 1 g (X g) of a sample in an aluminum cup (diameter: 5 cm) at 100° C. for 1 hour, and an ignition residue (Z g) was obtained by heating the resulting ignition residue (Y g) at 300° C. for 1 hour, and the amount of a stabilizer was subtracted from the amount N. The amount of the stabilizer was calculated based on the amount added at the time of preparation.

(5) Storage Stability

An aqueous dispersion (500 ml) contained in a plastic container was allowed to stand in a room at a constant temperature of 40° C. for 6 months. The aqueous dispersion after allowing to stand was gently stirred and allowed to pass through a 400-mesh stainless steel screen, and an aggregated matter left on the screen was dried at 300° C. for 1 hour. The amount of the aggregated matter was expressed as percentage of the resin solids content (based on the fluoropolymer in the original aqueous dispersion). If the storage stability is poor, a large amount of aggregated matter generates.

Production Example 1

A nonionic surfactant (TD-90, produced by Lion Corporation) was added to a PTFE aqueous dispersion 1-1 obtained in Example 8 of JP 2005-036002 A (average primary particle size: 274 nm, PTFE concentration: 22% by mass, fluorine-containing anionic surfactant: $CF_3(CF_2)_2O(CF_2)_2COONH_4$, amount of fluorine-containing anionic surfactant: 4280 ppm based on PTFE) so that a dispersion containing 15 parts by mass of the nonionic surfactant based on 100 parts by mass of the PTFE was prepared. Subsequently, a 20-mm diameter column was filled with 250 ml of a OH-form anion-exchange resin (product name: AMBERJET AMJ4002, produced by Rohm and Haas), and the temperature of the column was adjusted to 40° C. The PTFE aqueous dispersion 1-1 was allowed to pass through the column at SV=1. Further, the aqueous dispersion after passing through the column was maintained at 63° C. for 3 hours, and separated into a supernatant phase and a condensed phase. The condensed phase was recovered as a PTFE aqueous dispersion 1-2.

The PTFE aqueous dispersion 1-2 has a fluoropolymer concentration (PC) of 67.4% by mass and a nonionic surfactant concentration (NC) of 3.5 parts by mass based on 100 parts by mass of PTFE, and contains 1 ppm of a fluorine-containing anionic surfactant based on the PTFE.

Production Example 2

A nonionic surfactant (TDS-80, produced by DAI-ICHI KOGYO SEIYAKU CO., LTD.) was added to the modified PTFE aqueous dispersion 2-1 obtained in Experimental Example 2 of JP 2006-117912 A (average primary particle size: 283 nm, PTFE concentration: 29%, fluorine-containing anionic surfactant: $CF_3(CF_2)_6COONH_4$, amount of fluorine-containing anionic surfactant: 2400 ppm based on PTFE) so that a dispersion containing 15 parts by mass of the nonionic surfactant based on 100 parts by mass of the PTFE was prepared. Subsequently, a 20-mm diameter column was filled with 250 ml of an OH-form anion-exchange resin (product name: AMBERJET AMJ4002, produced by Rohm and Haas), and the temperature of the column was adjusted to 40° C. The PTFE aqueous dispersion 2-1 was allowed to pass through the column at SV=1. Further, the aqueous dispersion after passing through the column was maintained at 63° C. for 3 hours, and separated into a supernatant phase and a condensed phase. The condensed phase was recovered as a PTFE aqueous dispersion 2-2.

The PTFE aqueous dispersion 2-2 has a fluoropolymer concentration (PC) of 69.3% and a nonionic surfactant concentration (NC) of 2.8 parts by mass based on 100 parts by mass of the PTFE, and contains 1 ppm of a fluorine-containing anionic surfactant based on the PTFE.

Example 1

To the PTFE aqueous dispersion 1-2 obtained in Production Example 1 was added TD-90 in an amount of 6.0% by mass based on the amount of the PTFE and LATEMUL AD25 (25% aqueous solution of ammonium lauryl sulfate) produced by Kao Corporation in an amount of 500 ppm (in terms of active ingredients) based on the amount of the PTFE. Further, the PTFE concentration was adjusted to 60% by mass and the pH was adjusted to 9.8 using ion exchange water and ammonia water. The resulting aqueous dispersion contained 6.0% by mass of the nonionic surfactant based on the amount of the PTFE, and 0.05% by mass of the ammonium lauryl sulfate based on the amount of the PTFE.

The resulting aqueous dispersion was allowed to stand at 25° C. for 6 months, and measured for the pH and the percentage of an aggregate. The pH was 9.6, and the percentage of an aggregate was 1%.

Comparative Example 1

A dispersion having a PTFE concentration of 60% by mass and a pH of 9.8 was obtained in the same manner as in Example 1 except that EMAL 2F30 (30% aqueous solution of sodium lauryl sulfate salt) produced by Kao Corporation was added in an amount of 500 ppm (in terms of active ingredients) based on the amount of the PTFE instead of LATEMUL AD25 of Example 1. The resulting aqueous dispersion contained 6.0% by mass of the nonionic surfactant based on the amount of the PTFE, and 0.05% by mass of the sodium lauryl sulfate based on the amount of the PTFE.

The resulting aqueous dispersion was allowed to stand at 25° C. for 6 months, and the pH and the percentage of an aggregate were measured to be 4.3 and 3%, respectively.

Comparative Example 2

A dispersion having a PTFE concentration of 60% by mass and a pH of 9.8 was obtained in the same manner as in Example 1 except that a 5% aqueous solution of ammonium laurate obtained by neutralizing lauric acid produced by Wako Pure Chemical Industries, Ltd. with ammonia was added in an amount of 500 ppm (in terms of active ingredients) based on the amount of the PTFE, instead of LATEMUL AD25 of Example 1. The resulting aqueous dispersion contained 6.0% by mass of the nonionic surfactant based on the amount of PTFE, and 0.05% by mass of the ammonium laurate based on the amount of PTFE.

The resulting aqueous dispersion was allowed to stand at 25° C. for 6 months, and the pH and the percentage of an aggregate were measured to be 8.4 and 6%, respectively.

Examples 2 to 5

Aqueous dispersions were each prepared in such a way that to the PTFE dispersion 2-2 obtained in Production Example 2 was added TDS-80 in an amount of 6.0% by mass based on the amount of the PTFE and LATEMUL AD25 (25% aqueous solution of ammonium lauryl sulfate) produced by Kao Corporation in an amount of 100 ppm (in terms of active ingredients), 250 ppm (in terms of active ingredients), 500 ppm (in terms of active ingredients), or 1000 ppm (in terms of active ingredients) based on the amount of the PTFE; and the PTFE concentration was adjusted to 62% by mass and the pH was adjusted to 9.8 using ion exchange water and ammonia water. The resulting aqueous dispersions each contained 6.0% by mass of the nonionic surfactant based on the amount of the PTFE, and the ammonium lauryl sulfate in an amount of 0.01% by mass, 0.025% by mass, 0.05% by mass, or 0.1% by mass, based on the amount of the PTFE.

The resulting aqueous dispersions were allowed to stand at 40° C. for 6 months, and the pHs and the amounts of aggregates of the aqueous dispersions were measured. Table 1 shows the results.

Comparative Example 3

A dispersion was prepared in the same manner as in Example 4 except that EMAL 2F30 (30% aqueous solution of sodium lauryl sulfate salt) produced by Kao Corporation was used instead of LATEMUL AD25 in Examples 2 to 4. The resulting dispersion contained 6.0% by mass of the nonionic surfactant and 0.05% by mass of the sodium lauryl sulfate based on the amount of the PTFE.

The resulting aqueous dispersion was allowed to stand at 40° C. for 6 months, and measured for the pH and the amount of an aggregate. Table 1 shows the results.

TABLE 1

|  | Non-fluorinated anionic surfactant | Amount of non-fluorinated anionic surfactant (% by mass) | Initial pH | pH after 6 months | Aggregate (%) after 6 months |
|---|---|---|---|---|---|
| Example 1 | Ammonium lauryl sulfate | 0.05 | 9.8 | 9.6 | 1 |
| Example 2 | Ammonium lauryl sulfate | 0.01 | 9.8 | 9.6 | 18 |
| Example 3 | Ammonium lauryl sulfate | 0.025 | 9.8 | 9.6 | 15 |
| Example 4 | Ammonium lauryl sulfate | 0.05 | 9.8 | 9.7 | 9 |
| Example 5 | Ammonium lauryl sulfate | 0.1 | 9.8 | 9.7 | 16 |
| Comparative Example 1 | Sodium lauryl sulfate | 0.05 | 9.8 | 4.3 | 3 |
| Comparative Example 2 | Ammonium laurate | 0.05 | 9.8 | 8.4 | 6 |
| Comparative Example 3 | Sodium lauryl sulfate | 0.05 | 9.8 | 5.8 | 23 |

The aforementioned results show that use of ammonium lauryl sulfate enhances storage stability remarkably, and further provides excellent performance of pH stability.

The invention claimed is:

1. A production method of an aqueous dispersion comprising the steps of:

(a) polymerizing fluoromonomers in the presence of a fluorine-containing anionic surfactant to obtain an aqueous dispersion containing particles of a fluoropolymer;

(b) adding a nonionic surfactant into the aqueous dispersion;

(c) removing the fluorine-containing anionic surfactant from the aqueous dispersion and condensing the aqueous dispersion; and (d) adding, only after removing the fluorine-containing anionic surfactant and condensing the aqueous dispersion, 0.01 to 0.1% by mass, which is based on the amount of fluoropolymer, of ammonium lauryl sulfate into the aqueous dispersion from which the fluorine-containing anionic surfactant has been removed.

2. The production method according to claim 1, wherein said condensing comprises separating the aqueous dispersion into a fluoropolymer-non-containing supernatant phase and a condensed phase containing the fluoropolymer particles.

3. The production method according to claim 1, wherein the fluoropolymer is polytetrafluoroethylene.

4. The production method according to claim 1, wherein the nonionic surfactant is a polyoxyethylene alkyl ether.

5. The production method according to claim 1, wherein the aqueous dispersion comprises:

particles of a fluoropolymer having an average primary particle size of 0.1 to 0.5 μm in an amount of 50 to 70% by mass;

a nonionic surfactant in an amount of 2 to 10% by mass based on the amount of the fluoropolymer; and ammonium lauryl sulfate in an amount of 0.01 to 0.1% by mass based on the amount of the fluoropolymer, wherein an amount of a fluorine-containing anionic surfactant is less than 10 ppm.

6. The production method according to claim 1, wherein the ammonium lauryl sulfate is added in an amount of 0.05 to 0.1% by mass, based on the amount of fluoropolymer.

* * * * *